United States Patent [19]
Wear et al.

[11] Patent Number: 4,785,726
[45] Date of Patent: Nov. 22, 1988

[54] OILSEED CONDITIONING SYSTEM

[75] Inventors: Frederick C. Wear, St. Louis County, Mo.; Hal E. Bland, Raleigh, N.C.; Sadru Dada, Freehold, N.J.

[73] Assignees: McDonnell Douglas Corporation, St. Louis, Mo.; Aeroglide Corporation, Raleigh, N.C.; Continental Grain Company, New York, N.Y.

[21] Appl. No.: 75,150

[22] Filed: Jul. 20, 1987

Related U.S. Application Data

[62] Division of Ser. No. 756,356, Jul. 15, 1985, Pat. No. 4,728,522.

[51] Int. Cl.⁴ ............................ A23L 1/20; A23L 3/16
[52] U.S. Cl. ............................................ 99/451; 34/4; 99/483; 99/485; 99/537; 99/621

[58] Field of Search ................ 99/483, 451, 516, 537, 99/510, 485, 495, 600, 621; 426/242, 634, 625; 34/41, 15, 92; 219/10.55 R; 241/6, 8, 13, 221, 293

[56] References Cited

U.S. PATENT DOCUMENTS

| | | | |
|---|---|---|---|
| 4,340,611 | 7/1982 | McKinney et al. | 99/600 X |
| 4,359,480 | 11/1982 | Kock | 99/483 X |
| 4,361,083 | 11/1982 | Natusch | 99/348 X |
| 4,556,573 | 12/1985 | Bartesch et al. | 99/483 X |
| 4,646,631 | 3/1987 | Ward | 99/510 X |

Primary Examiner—Timothy F. Simone
Attorney, Agent, or Firm—Gravely, Lieder & Woodruff

[57] ABSTRACT

A system for treating oilseeds prior to solvent extraction in which the oilseeds are treated in a microwave dryer to raise their temperature to 140° F., passed hot through two-high rolls to crack the hulls and beans, the hulls are removed in an air sorter while at 140° F., and while still heated, the beans are sent to a flaking roll. The stream from the process to the solvent extractor has less than 5% fines.

11 Claims, 3 Drawing Sheets

SOYBEAN RECEIVING PROCESS

CONVENTIONAL OILSEED CONDITIONING SYSTEM

OILSEED CONDITIONING SYSTEM

OILSEED CONDITIONING SYSTEM

This is a divisional of co-pending application Ser. No. 756,356 filed on July 15, 1985, now U.S. Pat. No. 4,728,522.

BACKGROUND OF THE INVENTION

In U.S. Pat. Nos. 4,015,341 and 4,347,670 are disclosed apparatus for drying seeds and other grains using microwave energy. Among the seeds specifically mentioned in these patents are soybeans which are an important oil seed crop. These apparatus can be used in the present process and the apparatus of U.S. Pa. No. 4,347,670 is specifically useful in this process.

In processing soybeans into high-protein soybean meal, the outer layer of the bean is removed before the oil is extracted from the beans. Removal of the outer layer of the soybean traditionally is done by passing the beans through cracking rolls to fracture the hulls and an aspirator is then used to separate the hulls from the cotyledons in the crushed soybeans.

Before crushing the soybeans, the beans are dried to remove about 1 to 3% of the moisture remaining in the beans and the dried beans are stored for about three to eight days to equalize the moisture content in the beans so that the hulls crack uniformly when passed through the cracking rolls. This storage time is commonly called the "tempering" period.

The tempering period is quite expensive because it adds to the overall processing time. It also requires extensive storage facilities which further adds to the expense of the present process.

The drying of the beans presently is done by any of several conventional drying processes, such as heated air passed over a moving conveyor containing the beans, etc. All of the known conventional drying processes require the tempering period.

U.S. Pat. No. 4,340,611 discloses a process by which the tempering procedure is eliminated by drying the beans in a microwave dryer of the types described in U.S. Pat. Nos. 4,015,341 and 4,347,670 and immediately cracking the hulls of the hot beans. This patent, however, does not discuss subsequent processing of the soybean meats.

After the hulls are cracked, they must be removed and separated from the meat in order to produce the desirable high-protein, low-fiber stream of meats. The separated meats then are flaked at a temperature generally around 160° F. before being treated at a solvent extraction station to remove the oil. It is this latter portion of the soybean treatment process, i.e., the separation of meats from hulls and flaking, which the present invention primarily addresses.

A final step in the overall process is the production of soybean meal. The meal is produced after the oil has been removed from the meats and the resulting de-fatted meats have been desolventized and toasted.

High-protein, low-fiber soybean meal sells for a premium of approximately 6% over low-protein, high-fiber meal. Furthermore a plant processing high-protein, low-fiber meal can produce approximately 20% more product with the same equipment because of the reduced bulk of material flowing through the extraction plant and other portions of the system. Thus, at sites where there is a market for high-protein meal there are significant economic advantages for producing the high-protein product.

The essential step in producing high-protein meal is separation of the soybean hulls from the soybean meats. The conventional process for doing this requires a complicated multiplicity of shaking-screen separators, airstream sorters, cyclone separators and their attendant fans, rotary airlock valves and conveyors. This plethora of equipment requires much plant floor space. Furthermore, the conventional system was developed before energy costs accelerated and its design does not lend itself to energy economics.

After the beans are cracked, the meats are separated from the hulls and the meats are treated to produce hot, flaked, bean meats. Although the subsequent solvent extraction process is not part of this invention, it is of primary importance to the overall economics of the plant that the flakes leaving this stage of the process and entering the solvent extraction stage be at the optimum conditions of temperature, moisture content and thickness.

Conventionally beans are cracked and the meats and hulls separated at a temperature of about 80° F. Thereafter, before the beans are flaked, they must be heated to 160° F. in a bean conditioner. Because we crack hot beans, we are able to eliminate the bean conditioner, reduce the number of fines produced in the cracking rolls, eliminate a primary separation step because of the fewer fines in the cracked product, and we also recover waste heat from the magnetrons, if the product conditioner is a microwave dryer. All of the foregoing reduces process equipment cost, needed plant space, conveying equipment, and utilizes less energy.

The present invention comprises a system for conditioning oilseeds in a fast efficient manner, utilizing hot seeds from cracking through flaking, with subsequent savings in equipment cost and plant space, as well as reducing energy requirements and producing a high-protein, low-fiber product of reduced fines content.

DETAILED DESCRIPTION

Figure 1:
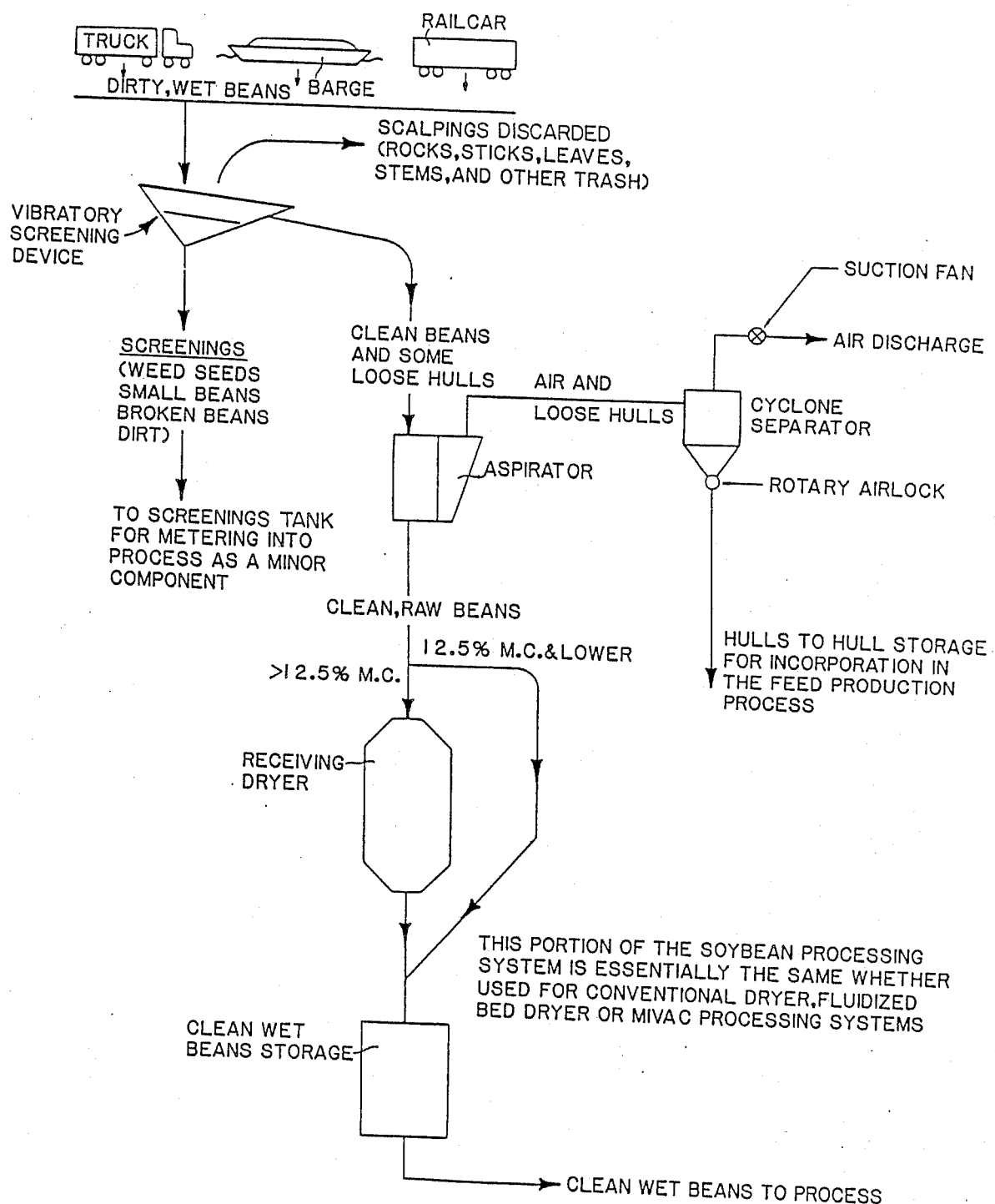
FIG. 1 is a schematic drawing showing the initial stages of an oil bean conditioning process which stages are common to the prior art and to the present process.

FIG. 1 shows the conventional soybean receiving process. The system shown in FIG. 1 is common to both the conventional system of FIG. 2 as will be hereinafter described, and to the improved system and process of the present invention which is shown in FIG. 3 and will be further described hereinafter.

In the receiving process of FIG. 1, raw soybeans arrive at the processing plant by truck, barge or railcar. These raw beans vary widely in moisture content and usually contain quantities of dirt, stems, leaves, rocks, weed seeds, and other debris that result from the harvesting and transportation methods used. The first step in the receiving process involves a vibratory screener which separates the clean beans and some loose hulls from the rock, sticks, and other debris, as well as from weed seeds and small and broken beans.

The product of the vibratory screening, namely the clean beans with some loose hulls are passed through an aspirator or air-stream sorter where the clean raw beans ar separated from the loose hulls. The hulls are later incorporated into a feed system which is not part of the present invention.

If the clean raw beans have a moisture content of 12.5% or less, they are routed directly to storage tanks to await processing. If they have a high moisture content, they pass through a receiving dryer (usually a conventional heated air dryer) and are dried to 12.5% or less before being sent to the storage tanks.

Figure 2:
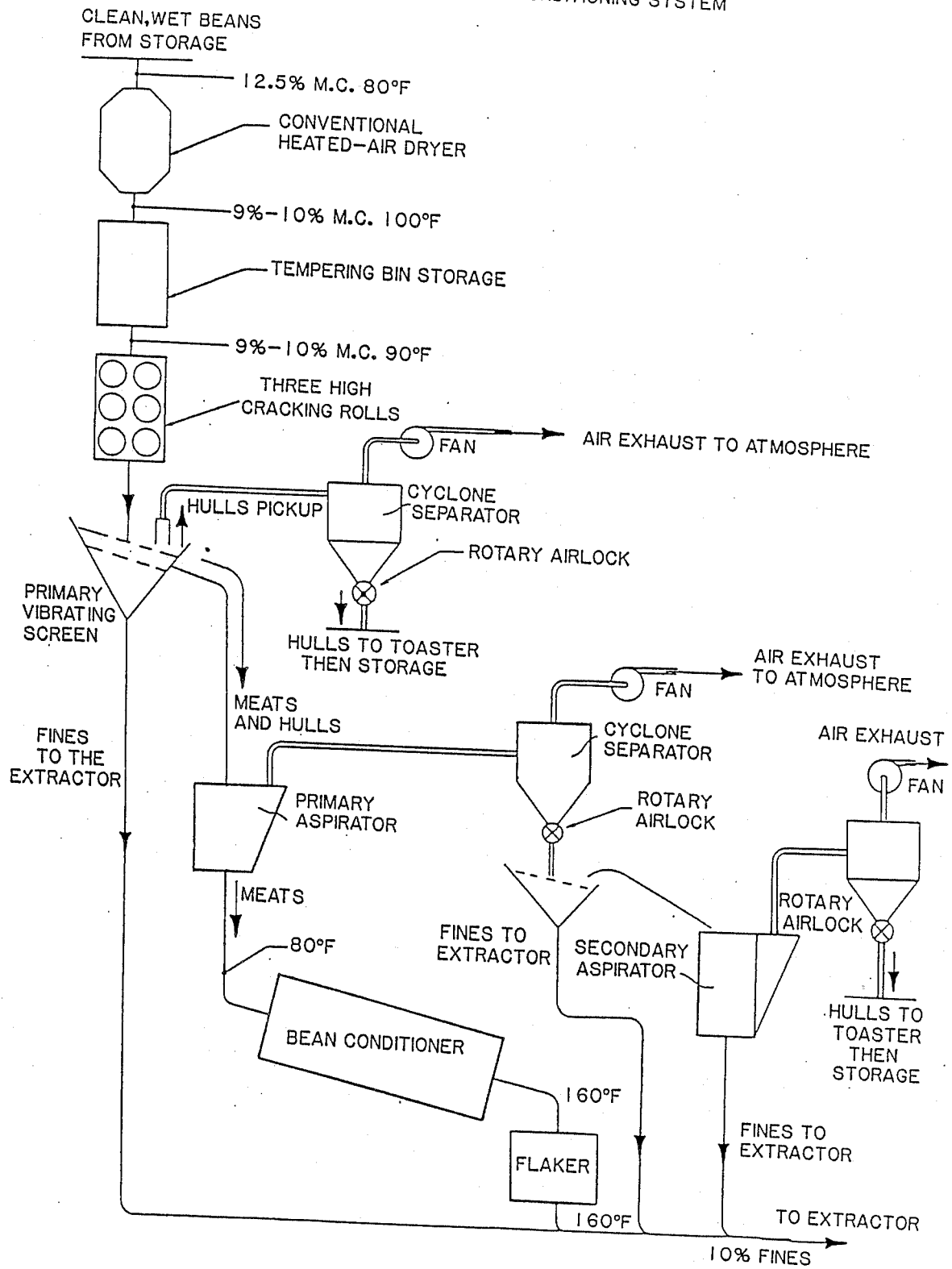
FIG. 2 is a schematic drawing of a conventional prior art oilseed conditioning process from the point where FIG. 1 stops to the solvent extraction step.
Figure 3:
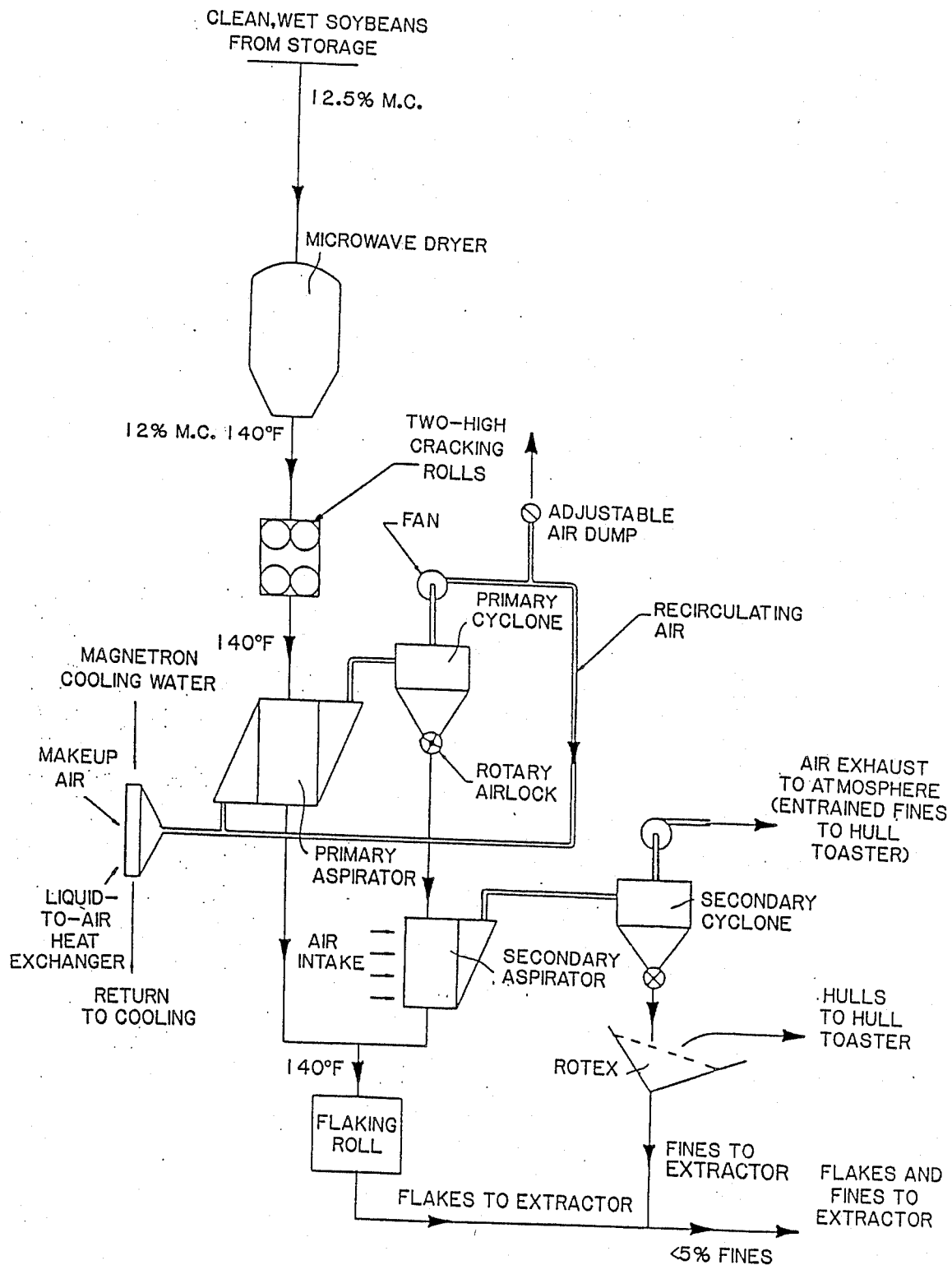
FIG. 3 is a schematic drawing of the present novel oilseed conditioning process from the point where FIG. 1 stops through flaking to the solvent extraction step.

FIG. 2 shows a conventional oilseed conditioning system which is commonly used in the soybean industry at present. FIG. 2 represents a process for taking the clean wet beans from storage through the flaking process to a stream which is then passed to a solvent extraction process. The solvent extraction process is not part of this invention. However, it is of primary importance to the overall economics of the plant that the flakes leaving the process of FIG. 2 and entering the solvent extraction stage be at the optimum condition of temperature, moisture content and thickness. Conventionally at this stage, the fines of the stream to the extractor constitute about 10%, on a dry solids basis, of the weight of the meal being passed to the extractor. It is very important to keep the percentage of fines as low as possible, because it is difficult to extract oil from the fines using the conventional solvent extraction process, and the fines interfere with all of the operations in the extraction process As noted, it is normal for the stream of meats to contain 10% by weight of fines as it leaves the flaking system and enters the solvent extraction system.

In the conventional system shown in FIG. 2 there is a drying and tempering system in which the clean, wet beans from storage having about 12.5% moisture and at an ambient temperature of approximately 80° F. are dried to about 9 to 10% moisture. The beans then are allowed to reside in tempering bins to equalize the moisture content in the beans and to lower their temperature from the 100° F. level, where they left the dryer, to about 90° F. This tempering step usually is from 3 to 8 days in length, and obviously uses plant space and requires considerable storage equipment in the form of tempering bins. It has long been thought essential that the beans be dried and tempered so that the hulls are released from the meats in the subsequent cracking, vibrating and aspirating steps.

From the tempering bins, at a temperature of about 90° F., the beans are passed to a "three-high" cracking roll where they are passed through three levels of corrugated cylindrical rolls, with two rolls operating in opposition at each of the levels. It is generally considered that the beans are broken into halves as they pass through the upper set of rolls, into quarters in the middle set of rolls, and into eighths in the lower set of rolls. Cracking is usually performed at bean temperature of about between 60° F. to 100° F.

The cracked beans are conveyed to a two-level screen known as a primary vibrating screen, where they are separated into three streams. A stream of fines is passed directly to the stream entering the solvent extraction system. A stream of hulls is separated and delivered to a toaster and then into hull storage to be used for feed. A product stream of meats and hulls is passed to a primary aspirator where the meats are separated from the hulls and fines at a temperature of about 80° F. The fines are separated from the hulls and passed to the feed stream for solvent extraction. The hulls are toasted and stored for use as feed. The meats at 80° F. are moved into a bean conditioner, where they are heated to a temperature of about 160° F. and, if necessary, moisture is added to bring the meats up to about 11.5% moisture condition. The conditioned heated beans are then passed to a flaker where they are reduced in size to the desired level for solvent extraction. It is essential that the meats be at a temperature of 140°–160° F., so that satisfactory flaking occurs.

In the separation of hulls from the meats and hulls, the hull portion is passed through a cyclone separator, a vibrating screen as well, and a secondary aspirator, to separate the fines from the hulls. As noted previously, the hulls are toasted and sent to hull storage, while the fines enter the product stream to the solvent extraction station. This type of process produces about 10% fines, principally caused by the three-high cracking rolls and the cool state of the beans as they pass through the cracking rolls.

FIG. 3 shows the improved process of the present invention. In this process the clean, wet soybeans from storage at a moisture content of about 10.5 to about 13.0%, usually about 12.5%, are passed through a heater, which preferably is a microwave dryer of the types shown in U.S. Pat. Nos. 4,347,670 and 4,015,341. The beans emerge hot (about 135° to about 160° F., preferably about 140° F.) and have had about 0.5 to about 1% moisture removed.

The beans then pass through a "two-high" cracking roll which is adequate because the beans at a temperature of 120° F. or more are in thermoplastic state, so that the meats are loosened from the hulls without the necessity for the heavy duty action of a three-high cracking roll. This treatment does not produce the large quantity of fines associated with the three-high process. In addition, the use of two-high rather than three-high rolls has the advantage of a reduction in capital cost and operating expense.

The crushed beans from the two-high rolls are moved directly into an air stream sorter or primary aspirator where the hulls are separated. The air for the aspirator is heated by being passed over the magnetron cooling water which is available when a microwave drying unit is utilized. The heated air maintains the temperature of the seeds at about 140° F., so that the seed meats then an be passed directly to the flaking rolls without further heating or conditioning. The hulls and fines from the primary aspirator are passed to the secondary aspirator and to a secondary cyclone where the hulls are separated and sent to a hull toaster for storage and use in feed, and the fines are passed directly into the stream to the solvent extraction system. The air used to separate the meats from the hulls in the primary aspirator is mostly recycled to prevent decreasing the bean temperature. The fans, cyclones, and aspirator are insulated to prevent heat loss to the environment. Approximately one-sixth of the circulating air stream is bled off continuously and is replenished with fresh air. The make-up air enters the system through a heat exchanger that warms the air to 150° F. to 160° F. to overcome any heat losses through the insulation. Waste heat from the magnetrons operating the microwave heater is utilized to warm the make-up air.

Thus it is clear that the present system eliminates the conventional drying and tempering apparatus utilized before cracking the bean hulls as well as eliminating the shaker screens downstream of the cracking rolls. This is possible because of the reduced amount of fines which result from the hot cracking of the product.

The present process utilizes hot cracking of the beans, thus allowing use of two-high cracking rolls, and the product from the cracking rolls, after hull separation, is passed directly to the flaking rolls, thus eliminating the bean conditioning apparatus. A recirculating hot air stream in the air stream sorter is used to maintain product temperature and to recover waste heat from the magnetrons.

The final product of this process as it is sent to the solvent extraction plant has a low-fiber content, a high-protein content, and less than about 5% fines.

The present invention is intended to cover all changes and modifications of the examples of the invention herein chosen for purposes of the disclosure which do not constitute departures from the spirit and scope of the invention.

What is claimed is:

1. A system for processing oilseeds including
   (a) a microwave dryer in which oilseeds are heated to about 160° F. and about 0.5 to 1.0% moisture is removed,
   (b) a two-high cracking roll which receives the heated oilseeds directly from the microwave dryer at the temperature of about 135° to about 160° F. and where the heated oilseeds are crushed to remove the hulls without the production of large quantities of fines,
   (c) a primary aspirator and primary cyclone system which receives separating air and which directly receives the crushed, heated oilseeds and where the hulls and fines are separated from the seed meats,
   (d) means for heating the separating air for the aspirator to maintain the temperature of the seed meats at about 135° to about 160° F. during separation,
   (e) a secondary aspirator and secondary cyclone system where the hulls are separated from the fines,
   (f) a flaking roll where the seed meats are flaked,
   (g) means for moving the seed meats directly from the primary aspirator in heated condition at the temperature of about 135° to about 160° F. to the flaking roll, and
   (h) means for combining the fines with the flaked oilseed meats to form a feed for an oil extraction system.

2. The system of claim 1 wherein the means for heating the air is the magnetron cooling water from the microwave heater.

3. The system of claim 1 including a hull roaster where the hulls and any entrained fines are toasted.

4. The system of claim 1 wherein the oil extraction feed has less than about 5% fines.

5. A system for processing oilseeds including
   (a) microwave dryer means for heating the oilseeds to about 135° to about 160° F.,
   (b) a cracking, hull removal and flaking arrangement in which the heated beans are passed, while in heated condition, directly from the dryer to two-high cracking rolls, from the rolls directly through air stream sorting means to separate the hulls and fines from seed meats and the seed meats are directly passed, while still heated, to flaking rolls, and
   (c) secondary means for separating the fines from the hulls and passing the fines directly into the feed to an oil extraction system.

6. The system of claim 5 wherein the magnetron cooling water from the microwave dryer is used to heat air for the air sorting means to maintain the temperature of the seed meats.

7. The system of claim 5 wherein the feed to the oil extraction system has less than about 5% fines.

8. A system for processing oilseeds including
   (a) a microwave dryer in which oilseeds are heated to about 135° to about 160° F.,
   (b) two-high cracking rolls for cracking the oilseeds from the dryer at said temperature of about 135° to about 160° F. whereby the oilseeds are crushed to remove the hulls without the production of large quantities of fines,
   (c) means for directly transferring the heated seeds from the microwave dryer to the two-high cracking rolls,
   (d) primary means for air separating the hulls and fines from the seed meats,
   (e) means for directly transferring the crushed oilseeds from the cracking rolls to the primary air separating means,
   (f) means for heating the air to the air separation means to maintain the temperature of the seed meats during separation,
   (g) secondary air separating means where the hulls are separated from the fines,
   (h) a flaking roll where the seed meats are flaked,
   (i) means for moving the heated seed meats from the primary air separator in heated condition to the flaking roll, and
   (j) means for combining the fines with the oilseed meats to form a feed for an oil extraction system.

9. The system of claim 8 wherein the means for heating the air for the air separator means is the magnetron cooling water from the microwave heater.

10. The system of claim 8 including a hull roaster where the hulls and any entrained fines are toasted 11. The system of claim 8 wherein the oil extraction feed has less than about 5% fines.

* * * * *